United States Patent [19]
Campbell et al.

[11] 3,839,299

[45] Oct. 1, 1974

[54] AMORPHOUS POLYAMIDE FROM BIS(4-AMINOCYCLOHEXYL)METHANE, BIS(CARBOXYPHENYL)METHANE AND ALKYLENE DICARBOXYLIC ACID

[75] Inventors: Robert W. Campbell; Paul R. Stapp; Hans D. Holtz, all of Bartlesville, Okla.

[73] Assignee: Phillips Petroleum Company, Bartlesville, Okla.

[22] Filed: Nov. 27, 1972

[21] Appl. No.: 309,695

[52] U.S. Cl.............. 260/78 R, 260/9, 260/33.4 R, 260/37 N
[51] Int. Cl............................................. C08g 20/20
[58] Field of Search .................................. 260/78 R

[56] References Cited
UNITED STATES PATENTS

| | | | |
|---|---|---|---|
| 2,516,585 | 7/1950 | Pease .............................. | 260/78 R |
| 2,696,482 | 12/1954 | Pease .............................. | 260/78 R |
| 2,836,579 | 5/1958 | Schweitzer ...................... | 260/78 R |
| 3,393,210 | 7/1968 | Speck............................... | 260/78 R |
| 3,416,302 | 12/1968 | Knospe ............................ | 260/78 R |
| 3,475,387 | 10/1969 | Carter et al...................... | 260/78 R |
| 3,481,133 | 12/1969 | Knospe ............................ | 260/78 R |
| 3,597,400 | 8/1971 | Kashiro et al.................... | 260/78 R |

*Primary Examiner*—Harold D. Anderson

[57] ABSTRACT

Substantially amorphous, optically clear polyamides are produced from a bis(4-aminocyclohexyl)methane or methyl derivative thereof and a bis(carboxyphenyl)methane or methyl derivative thereof. Copolyamides having desirable processing properties are produced by polymerizing the above monomers and at least one straight chain dicarboxylic acid as an additional monomer. The resulting polymers are useful as fibers as well as molding resins.

4 Claims, No Drawings

AMORPHOUS POLYAMIDE FROM BIS(4-AMINOCYCLOHEXYL)METHANE, BIS(CARBOXYPHENYL)METHANE AND ALKYLENE DICARBOXYLIC ACID

This invention relates to the production of polyamides. In accordance with another aspect, this invention relates to the production of amorphous, optically clear polyamides from bis(4-aminocyclohexyl)methane compounds and bis(carboxyphenyl)methane compounds. In accordance with a further aspect, this invention relates to copolyamides formed from bis(4-aminocyclohexyl)methane compounds, bis(carboxyphenyl)methane compounds, and straight chain dicarboxylic acids. In accordance with still another aspect, this invention relates to polyamides and copolyamides as defined above which are useful as fibers and molding resins.

Various polyamides formed from the condensation reaction of bis(4-aminocyclohexyl)methane, herein referred to as PACM, or methyl derivatives thereof and various dicarboxylic acids are known. Such materials are often employed as synthetic fibers, as well as being formed into other molded articles. It has now been found that there can be produced a polyamide of PACM, or methyl derivatives thereof, and a bis(carboxyphenyl)methane or methyl derivative thereof and, optionally, with a straight chain dicarboxylic acid as an additional monomer, which evidences unusual properties in respect to making a polyamide suitable for molding, especially if the copolyamide is produced from PACM or methyl derivatives thereof in which at least 40 percent of the PACM or methyl derivative thereof is of the trans-trans configuration.

Accordingly, an object of this invention is to provide novel polyamides having desirable molding characteristics.

Another object of this invention is to provide novel copolyamides suitable for molding.

Another object of this invention is to provide polyamides that can be filled with suitable filler materials yielding products suitable for molding.

Other objects and aspects as well as the several advantages of the invention will be apparent to those skilled in the art upon reading the specification and the appended claims.

In accordance with this invention, substantially amorphous, optically clear polyamides are produced by the polymerization of bis(4-aminocyclohexyl)-methane or methyl derivatives thereof with a bis(carboxyphenyl)methane or methyl derivative thereof.

Further in accordance with the invention, copolyamides are produced from bis(4-aminocyclohexyl)methane or methyl derivatives and bis(carboxyphenyl)-methane or methyl derivatives thereof with straight chain dicarboxylic acids.

In accordance with a specific embodiment, a copolyamide possessing excellent mechanical properties is produced from PACM having a trans-trans isomer content greater than 40 percent with a mixture of 75 mole percent suberic acid and 25 mole percent 2,2-bis(p-carboxyphenyl)propane.

The bis(4-aminocyclohexyl)methane or methyl derivative thereof for use in this invention can be represented by the formula

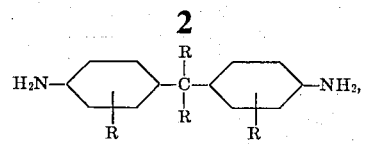

wherein each R is selected from hydrogen and methyl radicals. Mixtures of these diamines can be employed. Although any of the geometric isomers or mixtures thereof can be employed, it is preferred that at least 40 percent be of the trans-trans configuration.

The bis(carboxyphenyl)methane or methyl derivative thereof applicable in this invention can be represented by the formula

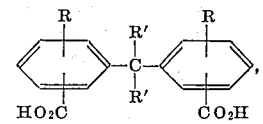

wherein each R and each R' is selected from hydrogen and methyl radicals. Mixtures of compounds represented by this formula can be employed. The preferred compounds are those in which each carboxy group is in the para position with respect to the

group, and each R' is preferably methyl. The compound of the above structure presently preferred for use in this invention is 2,2-bis(p-carboxyphenyl)propane.

The straight chain dicarboxylic acid which optionally but preferably is used as a comonomer in the production of the polyamides of this invention can be represented by the formula $HO_2C(CH_2)_xCO_2H$, wherein $x$ is an integer of 4–16, preferably 5–10, these preferred values of 5–10 representing average values of x when mixtures of straight chain dicarboxylic acids are employed.

The applicable straight chain dicarboxylic acids containing 6–18 carbon atoms include adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, and mixtures thereof.

In the polymerization process, the molar ratio of the dicarboxylic acid(s) to the diamine(s) should be substantially 1:1, although a slight excess, e.g., up to about 5 mole percent, of acid or amine can be used. When a straight chain dicarboxylic acid or mixture of such straight chain acids is employed, the straight chain dicarboxylic acid(s) can constitute up to about 85 mole percent, generally about 15–85 mole percent, of all the dicarboxylic acids used, preferably constituting about 50–80 mole percent of the total amount of dicarboxylic acids employed. Use of the straight chain dicarboxylic acids as herein preferred gives substantially amorphous, optically clear polyamides which can be molded into objects having a particularly desirable balance of properties, e.g., good strength, a high degree of stiffness, and excellent property retention at elevated temperatures. A particularly outstanding polyamide is produced by polymerizing bis(4-aminocyclohexyl)methane having a trans-trans isomer content greater than 40 percent with a mixture of 75 mole percent suberic acid and 25 mole percent 2,2-bis(p-carboxyphenyl)propane. Such a polyamide possesses an especially good balance of mechanical properties, property retention under a variety of conditions, and good melt processability.

The polyamides of this invention can be prepared by conventional polymerization procedures, e.g., by a melt polymerization process such as that described in U.S. Pat. No. 2,512,606. The polymerization preferably is conducted at a temperature within the range of about 260°–340°C for about 2–8 hours; however, polymerization temperatures and reaction times outside these ranges can be employed. Water can be present as a heat transfer agent and to aid in keeping the reactants in the reaction zone.

The polymers of this invention can be blended with various fillers or additives such as pigments, stabilizers, softeners, extenders, or other polymers. For example, there can be incorporated in the polymers of this invention substances such as graphite, carbon black, titanium dioxide, glass fibers, carbon fibers, metal powders, magnesia, silica, asbestos, wollastonite, clays, wood flour, cotton floc, alpha cellulose, mica, and the like. A more complete list of fillers is disclosed in Modern Plastics Encyclopedia, 41, No. 1a, September 1963, pages 529–536. If desired, such fillers can be added to the polymerization reactor.

EXAMPLE

A mixture of 121.31 g (0.5766 mole) of bis(4-aminocyclohexyl)methane having a trans-trans isomer content of 54 percent, 41.00 g (0.1442 mole) of 2,2-bis(p-carboxyphenyl)propane, 75.32 g (0.4324 mole) of suberic acid, and 45 g of deionized water was heated, under a nitrogen atmosphere, in an unstirred 1-liter autoclave for 2½ hours to a temperature of 320°C, at the end of which time the pressure was about 500 psig. Heating at 320°C was then continued at about 500 psig for 1 hour, after which the reactor was vented to atmospheric pressure over a period of about one-half hour, the reactor temperature being maintained at 320°C. Heating at 320°C was then conducted for about one-half hour under a slow nitrogen flush, after which the temperature was maintained at 320°C while the pressure was reduced to 20 mm Hg during a period of one-fourth hour. Finally, the reactor temperature was maintained at 320°C, while the pressure was maintained at 20 mm Hg, for 1¼ hours. Molten polymer was then extruded from the reactor into an aqueous bath, the quenched strands were combined with additional polymer chipped from the cooled reactor, and the resulting mixture was chopped in a mill. The polymer thus obtained had an inherent viscosity of 0.61, measured at 30°C in a m-cresol solution having a polyamide concentration of 0.5 g/100 ml solution; a polymer-melt temperature of 225°C, determined by placing the polymer on a heated bar with a temperature gradient; and a glass transition temperature of 175°C, determined by differential thermal analysis on premelted and quenched samples. Additional properties of the polymer, determined on specimens compression molded at 525°F (274°C), were as follows:

Tensile Strength, psi[a] 7860

Elongation, %[a] 9
Flexural Modulus, psi × 10⁻³[b] 288

-Continued
Izod Impact, ft-lb/in notch[c] 1.10
Heat Deflection Temperature, 264 psi, °F[d] 310
Hardness, Shore D[e] 85
Density, g/cc 1.0786

[a] ASTM D 638–68
[b] ASTM D 790–66
[c] ASTM D 256–56
[d] ASTM D 648–56
[e] ASTM D 2240–68

As shown above, the polymer produced, which was substantially amorphous and optically clear, had a particularly desirable balance of properties, including good strength, a high degree of stiffness, and excellent property retention at elevated temperature. The excellent property retention at elevated temperaure, as indicated by the high value for the heat deflection temperature, is especially desirable.

We claim:

1. A fiber-forming, substantially amorphous, optically clear solid polyamide consisting essentially of the polymeric reaction product of
  a. at least one bis(4-aminocyclohexyl)methane or a methyl derivative thereof of the formula

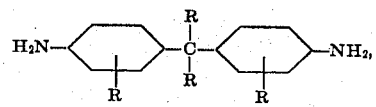

wherein each R is hydrogen or a methyl radical,
  b. at least one bis(carboxyphenyl)methane or methyl derivative thereof of the formula

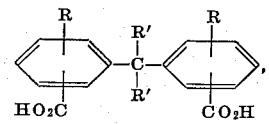

wherein each R and R' are hydrogen or a methyl radical, and
  c. at least one straight chain dicarboxylic acid having from 6–18, inclusive, carbon atoms;
wherein the molar ratio of (a) to the total of (b) and (c) is approximately 1:1 and (c) constitutes 15–85 mole percent of the total of (b) and (c).

2. A copolyamide according to claim 1 wherein (a) is bis(4-aminocyclohexyl)methane, (b) is 2,2-bis(p-carboxyphenyl)propane, and (c) is suberic acid, and said product has a glass transition temperature of about 175°C.

3. The copolyamide of claim 1 wherein (a) is bis(4-aminocyclohexyl)methane, (b) is 2,2-bis(p-carboxyphenyl)propane and (c) is suberic acid, and (c) constitutes about 75 mole percent of the total amount of (b) and (c).

4. The composition of claim 1 in which at least 40 mole percent of reactant (a) is in the form of a trans,-trans isomer.

* * * * *